United States Patent Office 2,972,574
Patented Feb. 21, 1961

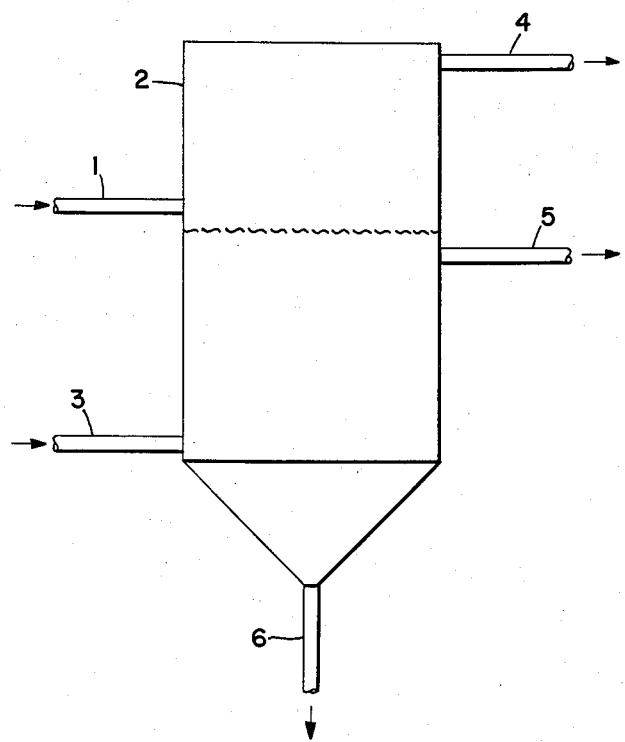
Warren K. Lewis  Inventor

2,972,574

WAX DEOILING BY DISPLACEMENT

Warren K. Lewis, Newton, Mass., assignor to Esso Research and Engineering Company, a corporation of Delaware Filed June 23, 1958, Ser. No. 743,596

7 Claims. (Cl. 208—33)

This invention relates to an improved method for separating crystals from a liquid medium.

In particular the invention relates to a continuous separation of hydrocarbon crystals such as xylene, durene or wax crystals from a mother liquor by a novel combination of displacement and extraction.

Heretofore such crystals have been filtered, pressured, centrifuged and washed by various procedures, all of which involved substantial investment costs per volume of crystal to be processed.

It is an object of this invention to combine solvent extraction with a gravitational displacement action. In most cases it will be necessary to lower the density of the liquid with a dilution solvent prior to contacting the liquid with a displacement solvent. However, in those instances where the density of the liquid medium is appreciably below the density of the crystals to be removed a dilution solvent may be omitted.

One method of this invention involves suspending the crystals to be washed in a low density dilution solvent that is chemically inert with relation to the crystals and a poor solvent for the crystals under the contacting conditions. The crystal-containing suspension is then countercurrently contacted by a displacement solvent having a higher density than the dilution solvent but a lower density than the desired crystals. A displacement solvent should be chosen that will be substantially chemically inert in relation to the desired crystals, a poor solvent for the crystals but a relatively good solvent for the mother liquor under the contacting conditions, miscible with the dilution solvent, and easily separable from the crystals when the displacement has been carried out. Although it is not essential to a separation of the crystals, as a practical matter a dilution solvent should be chosen that can be easily recovered from the displaced mother liquor.

Among the dilution solvents suitable for carrying out this invention are hydrocarbons and oxygenated compounds consisting of carbon, hydrogen and oxygen atoms.

Since the method is dependent upon relative densities the solvents to be employed will, of necessity, vary with the crystals to be separated and the mother liquor from which the crystals are to be freed. The solubility relationships of the solvents with respect to each other and to the crystals must, of course, be considered for any given separation.

Although the invention is by no means limited to the separation of any single type of crystals, for purposes of illustration the invention will be discussed in detail with regard to the separation of wax from wax-oil mixtures since the invention is particularly adaptable to the separation of paraffinic wax crystals from a petroleum lubricating oil and other hydrocarbon waxes from their mother liquor. For clarification, the term "dilution solvent" hereinbefore referred to will, in the explanation of wax separation, be referred to as "the dewaxing solvent."

Originally oils were dewaxed by placing the oil in a large tank in winter and allowing the wax to crystallize and settle to the bottom. Then when the process had been completed the oil was decanted off the top of the tank and used as lubricating oil. This process was replaced by oil-solvent mixtures and filtration because of its slowness. In conventional solvent dewaxing, a waxy oil-solvent mixture is chilled and filtered on rotary filters. The separation of wax from oil by conventional means is one of the most expensive refining processes.

Under a preferred method of this invention a waxy oil-dewaxing solvent mixture is chilled as in conventional dewaxing. The resulting chilled slurry is introduced into a displacement-extraction zone to be contacted countercurrently by the displacement solvent. A cold displacement solvent, which is heavier than the dewaxed oil-dewaxing solvent mixture and lighter than the wax, is pumped into the bottom of the vessel which contains the chilled slurry.

As mentioned before, the choice of each of the solvents will be somewhat dependent upon the other solvent employed. Among the various dewaxing solvents that may be employed are aliphatic hydrocarbons having 1 to 7, preferably 3 to 6, carbon atoms per molecule such as propane, butane, pentane and hexane. Among the displacement solvents which may be found suitable for use with the aforementioned dewaxing solvents are the ketones having 3 to 6 carbon atoms per molecule, acetates having 3 to 6 carbon atoms per molecule, and blends of these compounds with hydrocarbons and with each other.

If hexane is employed as the dewaxing solvent with methyl ethyl ketone as the displacement solvent the method can be carried out at atmospheric pressure. In some cases such as where propane is used as the dewaxing solvent it will be necessary to operate under a pressure in the range of 0 to 25 p.s.i.g., preferably in the case of propane in the range of 3 to 10 p.s.i.g. The displacement-extraction column is maintained throughout the operation at dewaxing conditions, i.e. in the range of 0° F. to −50° F., preferably −20° F. to −35° F. The cold displacement solvent being heavier than the oil-dewaxing solvent mixture thus displaces the latter upward toward the top of the column where it may be continuously removed. The wax being heavier than the displacement solvent settles through the latter and precipitates in the bottom of the column. After most of the oil has been displaced, the washing action of fresh displacement solvent contacting the wax crystals provides additional oil removal by extraction. The wax crystals and some of the displacement solvent are removed from near the bottom of the column whereupon the wax crystals may be recovered from the displacement solvent by conventional means such as filtration or distillation. It should be understood that in the wide application of this method the means most suitable for separating the desired crystals from the displacement solvent will be dictated by the properties of the crystals involved and the solvent employed. It should also be understood that where the physical properties of the components under operating conditions permit, the dilution solvent may be introduced into the mother liquor inside the displacement-extraction zone.

The amount of displacement solvent required will vary inversely with the number of displacement-extraction stages, i.e. the height of the column employed, and, of course, will vary with the crystal feed to the tower and the solvents employed.

To obtain the proper displacement it is desirable to avoid convection mixture of the two solvents. However, the density differences existing in the wax-oil-solvent system may be magnified by centrifugal force. Several improved continuous centrifuges currently available can be adapted for carrying out this method if a faster crystal settling rate is desired.

This method, although particularly directed to continuous separation where large scale operations are necessary, may also be used for batch type separations. Dilution ratio, i.e. volume dewaxing solvent/volume of mother liquor, will materially affect settling rate and hence crystal throughput. When this method is employed in dewaxing operations a dilution ratio of 1.2 to 6, preferably 2 to 3 should be used.

The invention may be more easily understood by reference to the drawing which illustrates, by means of a flow sheet, the method herein described when applied to the separation of wax crystals. A slurry obtained by chilling to dewaxing temperatures a waxy oil-dewaxing solvent mixture is introduced into displacement-extraction column 2, maintained at dewaxing conditions, via line 1. A displacement solvent having a higher density than the dewaxed oil-dewaxing solvent mixture but lower than that of the wax is fed into column 2, near the bottom of said column via line 3. The displacement solvent rises slowly in the lower portion of column 2 displacing the dewaxed oil-dewaxing solvent mixture while wax crystals settle to the bottom of column 2. In the preferred embodiment of this method the flow rates of the line 1 and line 3 streams are controlled to permit the displacement solvent, except that small part which may dissolve in the dewaxing solvent, to rise only to a predetermined intermediate level in column 2. At this point, a rather sharp interface between the two liquids is desirable with the lighter dewaxed oil-dewaxing solvent mixture resting upon the displacement solvent and upon building up in column 2, this lighter solvent exits via line 4. The dewaxed oil may then be separated from the dewaxing solvent by conventional means. To maintain the displacement solvent at a constant level during continuous operation, a side stream comprising displacement solvent and minor amounts of dewaxed oil and wax may be removed slightly below the said interface via line 5. If desired, the contents of this stream may be recycled to line 3, either with or without intermediate filtration. Settled wax which has been continuously washed by incoming displacement solvent from line 3 is removed with displacement solvent via line 6. The wax may then be recovered from the displacement solvent by conventional means.

*Example I*

A wax containing oil having a boiling range of 800° to 950° F. and a viscosity of 54 to 56 S.S.U at 210° F. was diluted with hexane in a hexane/oil ratio of 1.5 to 1 and chilled to −35° F. The resulting slurry was introduced into a 6 inch column having a capacity of about 300 cc. The column was maintained at about −35° F. and cold methyl ethyl ketone was pumped into the bottom of the column at a rate to provide a 0.2 to 0.4 mm./min. rise of the methyl ethyl ketone in the column. The methyl ethyl ketone displaced the oil-hexane mixture upward and waxed crystals settled through the methyl ethyl ketone to the bottom of the column where they were washed by fresh incoming methyl ethyl ketone. The final oil content of the precipitated crystals varies with the amount of methyl ethyl ketone washing they are subjected to. The precipitated wax crystals were removed from the bottom of the column in a wax-methyl ethyl ketone mixture and separated from the methyl ethyl ketone. Upon examination of the wax crystals it was found that they retained an oil content of 1.5% after 106 ml. of methyl ethyl ketone had entered the column per ml. of wax recovered.

*Example II*

The mixture of Example I was processed in the same manner as in Example I except that the wax was removed from the column while retaining a 5% oil content. The amount of methyl ethyl ketone introduced in the column was measured and it was found that approximately 25 ml. of methyl ethyl ketone had been used per ml. of (5% oil content) wax recovered.

*Example III*

Another test was conducted in exactly the same manner as in Example 2 except that a 30 inch column was used. The amount of methyl ethyl ketone introduced into the tower was measured and it was found that the increase in height of the tower reduced the solvent requirement from approximately 25 to approximately 10 ml. of methyl ethyl ketone/ml. of (5% oil content) wax recovered.

In summary, this invention relates to a method of separating crystals from a liquid medium by a novel displacement extraction technique and is particularly adaptable for separating wax crystals from a lubricating oil.

What is claimed is:

1. A continuous method for separating hydrocarbon crystals from a diluted mother liquor which comprises continuously introducing into a displacement-extraction zone having a lower portion and an upper portion, a displacement solvent having a density lower than the density of said crystals and greater than the density of said diluted mother liquor, maintaining said displacement solvent at a predetermined level in said zone by continuously removing from said zone below said level a stream comprising said displacement solvent, admixing with said mother liquor a dilution solvent having a lower density than said mother liquor and in which said crystals are substantially insoluble, continuously introducing the resulting diluted mother liquor containing said crystals into said zone above said level thereby establishing two liquid phases in said zone forming an interface with each other and consisting of an upper phase comprising said diluted mother liquor and a lower phase comprising said displacement solvent, contacting said crystals as they settle downwardly from said upper phase into said lower phase with incoming displacement solvent to displace upwardly occluded amounts of said mother liquor, continuously removing from said upper portion of said zone mother liquor and dilution solvent from which said crystals have been displaced, removing said crystals from said zone as bottoms with said displacement solvent and recovering said crystals from said displacement solvent.

2. A method according to claim 1 wherein said zone is maintained at atmospheric pressure.

3. A method for the continuous separation of paraffinic wax crystals from a petroleum lubricating oil which comprises admixing with said lubricating oil a hydrocarbon dilution solvent having a lower density than said lubricating oil, chilling the resulting mixture to a temperature in the range of 0° F. to −50° F., to form a slurry of said crystals in the diluted oil, introducing the resulting slurry into a vertical countercurrent displacement-extraction column continuously introducing into said column below said slurry a displacement solvent having a density greater than said diluted oil but less than said crystals, operating said column at a temperature in the range of 0° F. to −50° F. and at a pressure of 0 to 25 p.s.i.g., maintaining said displacement solvent at a predetermined level in said column by continuously removing from said column below said level a displacement solvent comprising stream, removing from said column near the top thereof an overhead stream comprising lubricating oil and dilution solvent, contacting said crystals as they settle downwardly from said diluted oil into said displacement solvent with incoming displacement solvent to displace upward occluded amounts of said lubricating oil, removing said crystals from said column as bottoms with said displacement solvent and recovering said crystals from said displacement solvent.

4. A method according to claim 3 wherein said hydrocarbon dilution solvent is an aliphatic hydrocarbon having 1 to 7 carbon atoms.

5. A method according to claim 3 wherein said hydrocarbon dilution solvent is hexane.

6. A method according to claim 3 wherein said displacement solvent is an oxygenated hydrocarbon compound selected from the group consisting of ketones and acetates having 3 to 6 carbon atoms per molecule.

7. A method according to claim 3 wherein said displacement solvent is methyl ethyl ketone.

References Cited in the file of this patent

UNITED STATES PATENTS

| | | |
|---|---|---|
| 2,079,596 | Alexander | May 11, 1937 |
| 2,089,984 | Ritter | Aug. 17, 1937 |
| 2,218,519 | Campbell | Oct. 20, 1940 |
| 2,248,498 | Gross et al. | July 8, 1941 |
| 2,266,553 | Jones | Dec. 16, 1941 |